Patented Feb. 15, 1972

3,642,742
TOUGH, STABLE TETRAFLUOROETHYLENE-FLUOROALKYL PERFLUOROVINYL ETHER COPOLYMERS
Dana Peter Carlson, Wilmington, Del., assignor to E. I. du Pont de Nemours and Company, Wilmington, Del.
No Drawing. Filed Apr. 22, 1969, Ser. No. 818,391
Int. Cl. C08f 15/02
U.S. Cl. 260—87.5 A                    8 Claims

ABSTRACT OF THE DISCLOSURE

Tough, stable copolymers of tetrafluoroethylene monomer and fluorovinyl ether monomers can be produced by polymerizing the monomers in perfluorinated or suitable non-perfluorinated hydrogen and chlorine containing fluorocarbon solvents by a process that requires that the reaction be carried out at from about 30 to about 75° C. in the presence of a low temperature initiator such as bis(perfluoro propionyl) peroxide and a hydrogen containing chain transfer agent such as methanol.

BACKGROUND OF THE INVENTION

This invention relates to the polymerization of tetrafluoroethylene monomer with fluoroalkyl perfluorovinyl ether monomer in a perfluorinated or saturated nonperfluorinated fluorocarbon solvent in the presence of a chain transfer agent.

Prior to this invention copolymers of tetrafluoroethylene and fluoroalkyl perfluorovinyl ether have been polymerized in various non-aqueous media. The polymers formed in these non-aqueous systems contain acid fluoride end groups that result from the rearrangement of the fluorovinyl ether radical on the end of the growing polymer chain. The rearrangement reaction takes place by the mechanism:

$\sim\!\!CF_2CF_2\cdot + R_fOCF\!=\!CF_2 \longrightarrow$

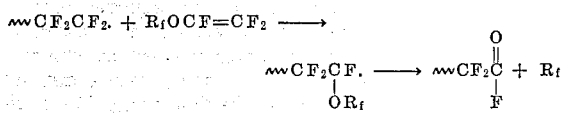

This rearrangement results in the terminal of the polymerization of that chain by the formation of an acid fluoride end group and a new free radical group. During storage, these end groups are hydrolized and decompose during extrusion forming gases which show up as bubbles in extruded products. This is obviously undesirable. These end groups can be stabilized by use of the humid heat treatment process of U.S. Pat. No. 3,085,083 entitled "Stabilized Tetrafluoroethylene-Fluoroolefin Copolymers Having CF$_2$H End-Groups" which converts the unstable acid end groups into stable-CF$_2$H end groups. The major disadvantages of the humid heat treatment are that it is slow, adds considerable cost to polymers that are treated in this manner and also tends to add or allow contamination of the polymer with dust and other particles which may be introduced in the heat-treatment process.

Another problem with tetrafluoroethylene/fluorovinyl ether (TFE/FVE) copolymers is their tendency to swell on being extruded through small orifices into tubes, wire coating, and the like. This swelling causes problems in dimension control of the finished parts but, worse than that, it causes excessive shrinkage of the parts when they are reheated near the melting point. High swelling resins have a highly shear stress dependent viscosity indicating a broad molecular weight distribution. The higher the swelling, the broader the molecular weight distribution at the same melt viscosity. The reason for this swelling is that the polymer is viscoelastic and some of the energy put in to cause flow results in elastic or recoverable deformation. It is this elastic recovery which causes the swelling of the polymer as it emerges in viscous flow from an orifice. A polymer with a broad molecular weight distribution contains at equal melt viscosity, a larger proportion of very high molecular weight molecules, which have large elastic components, than a polymer with narrow molecular weight distribution. Thus, the former polymer would be expected to swell to a greater degree than the latter polymer. In certain applications of tetrafluoroethylene-fluorovinyl ether copolymers it is highly desirable that the resin undergo little shrinkage when heated near its melting point. A specific embodiment of this invention on tetrafluoroethylene/fluorovinyl ether copolymers, prepared in the presence of methanol as chain transfer agents, is their considerably reduced tendency to swell upon being extruded and consequently to shrink when heated near their melting point. As was stated above, it is believed that the reduction in the swelling tendency of the copolymer prepared in the presence of methanol is due to its narrower molecular weight distribution. Another advantage of the polymers of this invention is their improved toughness as indicated by their MIT flex life. The MIT flex life normally increases with melt viscosity and fluorovinyl ether content of the polymer. Thus, if the fluorovinyl ether content is held constant, the MIT flex life can be increased by increasing the melt viscosity of the polymer. Similarly, if the melt viscosity is held constant, the MIT flex life can be increased by increasing the fluorovinyl ether content of the polymer. We have found that the MIT flex life is increased for polymers with the same melt viscosity and fluorovinyl ether content when they are prepared in the presence of methanol. It is believed that the increase in toughness of the polymers prepared in methanol is also due to their narrower molecular weight distribution relative to polymers prepared in the absence of methanol. Melt viscosity is a function of both weight average and number average molecular weights while toughness is primarily a function of number average molecular weight. If the molecular weight distribution is narrowed, the ratio between weight average and number average molecular weight will be less. Thus, at the same melt viscosity, the polymers with a narrower distribution will have a higher number average molecular weight and consequently higher toughness. In certain applications of tetrafluoroethylene/fluorovinyl ether copolymers it is highly desirable that the resins have high toughness but still have low enough melt viscosity (1–100×10$^{-4}$ poises) for easy fabrication and contain the minimum amount of the expensive fluorovinyl ether to be commercially attractive. This is particularly important in applications such as tank linings and thin walled tubing which require high stress crack resistance.

As discussed in U.S. Pat. No. 3,085,083, to Schreyer, carboxylate end-groups in the fluorocarbon polymer chain are the principle cause of the instability of fluorocarbon polymer at melt fabrication temperatures. Since acid fluoride end groups

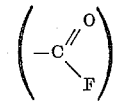

are the result of the rearrangement of the fluorovinyl ether on the end of the growing chain and since these are easily converted to carboxylic acid end groups it can easily be seen that this type of chain termination will result in polymer instability.

Since it is known that the number of unstable end groups formed on TFE/FVE copolymers decreases as the molecular weight increases, one would expect that decreasing the amount of initiator to produce high molecular weight polymer would decrease instability and increase the MIT flex life of the polymer. This of course happens, but there is also a large decrease in the ease of fabricability of the polymer. Addition of a hydrogen containing chain transfer agent to the polymerization recipe reduces the number of chain terminations that are made by rearrangements of the FVE monomer and increases the number of chain terminations such as those by the mechanism

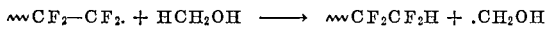

The end groups formed by the chain transfer agent are stable hydride end groups ($-CF_2H$), the same end groups that result from the patented Schreyer process. The resulting polymer has approximately the same number of unstable acid fluoride end groups as a much higher molecular weight polymer made by a process without the chain transfer agent present.

SUMMARY OF THE INVENTION

The invention consists of polymerizing a solution of tetrafluoroethylene and fluorovinyl ether monomers by a non-aqueous process similar to that disclosed in U.S. patent application 679,162 to D. P. Carlson filed Oct. 30, 1967 in the presence of a hydrogen containing chain transfer agent. The process consists of polymerizing the monomers in perfluorinated or relatively inexpensive non-perfluorinated fluorocarbon solvents by initiating the reaction with low temperature initiator soluble in the solvent monomer solution. The polymerization is conducted at temperatures from about 30° C. to about 75° C. and is done in the presence of a suitable hydrogen containing chain transfer agent.

The process by which the tetrafluoroethylene/fluoroalkyl perfluorovinyl ether (TFE/FVE) copolymer can be formed is as follows:

(a) A suitable fluorocarbon solvent is charged into a stirred autoclave;

(b) Fluorovinyl ether monomer and a suitable chain transfer agent are charged into the fluorocarbon solvent;

(c) The solution of step (b) is adjusted to polymerization temperature and tetrafluoroethylene is charged to bring up the pressure in the system so the ratio of TFE dissolved in the solvent to monomer dissolved in the solvent is such so as to produce the desired polymer;

(d) A low temperature initiator is charged to the autoclave in a solution of the fluorocarbon solvent;

(e) The pressure in the reactor is maintained throughout the reaction by continuously adding monomers to the autoclave to maintain the pressure and comonomer ratio; and (f) The reaction is allowed to proceed until the desired degree of polymerization has been reached.

The autoclave is then dumped and the solvent is flashed from the polymer and recovered.

Suitable solvents for the process are perfluorinated solvents such as perfluorocyclobutane, perfluorodimethyl cyclobutane and perfluorocyclohexane. Preferred solvents are commercially available chlorofluoroalkanes and some chlorofluorohydroalkanes having from 1–4 carbon atoms and preferably 1–2 carbon atoms. The solvents may be chlorofluoroalkanes in which each carbon atom is substituted by at least one fluorine atom. Said chlorofluoroalkanes may also contain a maximum of one hydrogen atom per carbon atom if the hydrogen is present only in the difluoromethyl grouping ($-CF_2H$). Suitable solvents must be liquid at polymerization conditions. Examples of preferred solvents are as follows: $CCl_2F_2$, $CCl_3F$, $CClF_2H$, $CCl_2FCCl_2F$, $CCl_2FCClF_2$ and $CClF_2CClF_2$. These compounds are sold under the trade names "Freon 12," "Freon 11," "Freon 22, "Freon" 112, "Freon" 113 and "Freon" 114, respectively. The most preferred solvent is "Freon" 113.

The process can be used in polymerization of tetrafluoroethylene with comonomers that undergo rearrangement to form acid fluoride groups. One or more of the comonomers can be copolymerized or terpolymerized with tetrafluoroethylene to produce a co- or ter-polymer. Examples of preferred monomers which can be copolymerized with tetrafluoroethylene are as follows: fluorovinyl ethers having the general formula $X CF_2(CF_2)_nOCF=CF_2$ where $X=F$ or $H$ and $n=1–7$ such as perfluoroethyl perfluorovinyl ether, perfluoropropyl perfluorovinyl ether, 3-hydroperfluoropropyl perfluorovinyl ether and isomers thereof; fluorovinyl polyethers having the general formula

where $X=F$ or $H$ and $n=0–7$ and isomers thereof; and perfluoro-3,6-dioxa-4-methyl-7-octene sulfonyl fluoride.

Initiators suitable for the process must be soluble in fluorocarbon solvents and have high activity between about 45° C. and 80° C. Also the initiators must give radicals which will result in stable end groups on the polymer chain. Fluorocarbon acyl peroxides are suitable initiators in that they meet the requirements stated above. Fluorocarbon acyl peroxides which are suitable for use in the process are represented by the formula

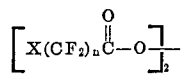

where $X=H$ or $F$ and $n=1–10$. The preferred initiator is bis(perfluoropropionyl) peroxide. A low temperature initiator must be used because the temperature of the polymerization system should not go over about 75° C. Above 75° C. the rearrangement of the fluorovinyl ether occurs so much more rapidly that a greater number of chains are terminated in acid fluoride end groups than can be tolerated.

Carboxylic acid end groups in the polymer are termed "unstable end groups" because they decompose readily, during fabrication of the polymer, giving rise to bubbles in the finished product. Other end groups such as vinyl and acid fluoride end groups are also included in the category of unstable end groups because they are readily converted to carboxylic acid end groups.

The existence and quantity of these end-groups in the polymer were determined by the infrared spectrum generally obtained on compression molded films of about 10 mils thickness. The end-groups of interest were found to absorb at 1883 cm.$^{-1}$, 1814 cm.$^{-1}$, 1793 cm.$^{-1}$ and 1781 cm.$^{-1}$. The 1883 cm.$^{-1}$ band measures the acid fluoride groups ($-COF$) in the polymer. The 1814 and 1781 cm.$^{-1}$ bands measure the free and bonded forms, respectively, of the carboxylic acid groups ($-COOH$). The 1793 cm.$^{-1}$ band measures the vinyl end-group ($-CF=CF_2$). The quantitative measurement of the number of these groups was obtained by the measurement of the extinction coefficients of each of these groups from model compounds and transferring these coefficients to the measurements obtained on the polymer. Stable-$CF_2H$ groups were measured in the same way by use of the 3012 cm.$^{-1}$ band. Because of the overlapping of some of the bands it was found necessary to correct the absorbances for contributions from several groups. The end-groups are expressed as the number per one million carbon atoms in the polymer.

The term "specific melt viscosity" as used herein means the apparent melt viscosity as measured at 380° C. under a shear stress of 6.5 pounds per square inch. Specific melt viscosity is determined by using a melt indexer of the type described in ASTM D-1238-52-T, modified for corrosion resistance to embody a cylinder, orifice, and a piston made of Stellite cobalt-chromium-tungsten alloy. The resin is charged to the 0.375 inch I.D. cylinder which is held at 380° C.±0.5° C. allowed to come to an equilibrium temperature during 5 minutes, and extruded through the 0.0825 inch diameter, 0.315 inch long orifice under a piston loading of 5000 grams. The specific melt viscosity in poises is calculated as 53,150 divided by the observed extrusion rate in grams per minute. The stability of the polymer may also be measured by the volatiles index. In this test, a 10 g. sample of the resin is placed in an aluminum foil thimble, which is charged into a glass vial attached to a vacuum system. The vial is evacuated to 2 mm. (Hg) and then on reaching equilibrium, placed in a hot block maintained at 380° C. The change in pressure is recorded every ten minutes over a period of 60 minutes. The volatiles index is calculated by the following equation $$V.I. = \frac{(P_{40} - P_0)}{10} V$$

where $P_{40}$ and $P_0$ are the pressures of the sample in mm. prior to insertion and after 40 min. in the hot block and V is the volume of the vial.

It is preferred that the volatiles index be less than 25 because above this value the amount of bubbles formed on extrusion is detrimental to the resins properties.

Due to the high molecular weight and insolubility of the tetrafluoroethylene/fluoroalkyl-perfluorovinyl ether copolymers, the measurement of their molecular weight distributions by classical methods is impossible. Instead we have devised a test to measure the tendency of resins to swell upon being extruded which we believe to be related to molecular weight distribution as already discussed above. The "percent swelling" is determined during the measurement of melt viscosity by the procedure previously described. The diameter of the strand extruded from the orifice of the melt indexer is measured and compared with the diameter of the orifice. The "percent swelling" is the increase in diameter of the extruded strand versus the diameter of the orifice as indicated by the equation below.

"Percent swelling" = $D_E/D_D - 1 \times 100$ where $D_E$ = diameter of extrudate; $D_D$ = diameter of orifice.

For many applications it is desirable that the "percent swelling" be less than 25. Previous tetrafluoroethylene/fluorovinyl ether copolymers had "percent swelling" in excess of 50. Polymers prepared in the presence of methanol have "percent swelling" less than 25 and usually less than 20.

Several hydrogen containing chain transfer agents can be used to provide stable end groups on the polymer and overcome the tendency for the formation of acid fluoride end groups. Specifically, materials such as methanol, 2-hydroperfluoropropane, cyclohexane, chloroform, isopropanol, dichloromethane and ethanol are useful for this purpose. However, of these we have found methanol to be unique in this system to provide polymers with stable end groups as well as improved toughness and reduced tendency to swell.

The foregoing process will be exemplified in the following examples:

Example I

Into an evacuated, one liter, stainless steel, agitated pressure vessel were charged 860 ml. of 1,2,2-trichloro-1,1,2-trifluoroethane (F-113) and 10.6 grams perfluoropropyl perfluorovinyl ether (PPVE). The mixture was heated to 50° C. and tetrafluoroethylene (TFE) was charged into the vessel until 30 p.s.i.g. pressure was attained. Then 0.74 gram of perfluoropropionyl peroxide initiator (3-P) was pumped into the clave as about a 1% solution in F-113. The operating pressure was maintained by adding additional TFE during the run. The temperature was controlled by a circulating water system on the jacket side of the reactor and conventional control elements. After 10 minutes reaction time, the TFE feed was shut off and the polymer suspension was removed from the bottom of the reactor. The gel was filtered using a fritted glass filter and a vacuum flask and the solvent wet polymer was dried in a circulating air oven at 100° C. for approximately 16 hours. The polymer was then weighed and characterized. The dry polymer weighed 63 gm. and had a melt viscosity of $10.4 \times 10^4$ poises at 380° C. The polymer contained 109 unstable end groups per $10^6$ carbon atoms and contained 3.7 wt. percent PPVE. It had an MIT flex life of 57,000.

Example II

Using the procedure of Example I a similar run was performed except that 16.5 gm. PPVE, 0.10 gm. 3-P initiator and 50 p.s.i.g. pressure was used. The polymer formed (49.7 gm. in 22 min.) had a melt viscosity of $170 \times 10^4$ p., 44 unstable end groups per $10^6$ carbon atoms and had a PPVE content of 2.5 wt. percent.

Example III

A polymerization run identical to Example II using 0.50 ml. of methanol produced 60.5 gm. of polymer in 33 min. and had a melt viscosity of $13.5 \times 10^4$ p., 33 unstable end groups per $10^6$ carbon atoms and contained 2.7 wt. percent PPVE. It had an MIT flex life of 104,000.

Example IV

Using the procedure of Example I a similar run was performed except that 28 g. of PPVE, 90 p.s.i.g. of TFE and a 60° C. temperature were used. No methanol was used and 75.8 gm. of polymer was produced in 11 minutes. The polymer contained 2.8 wt. percent PPVE, had a melt viscosity of $158 \times 10^4$ and contained 41 unstable end groups per $10^6$ carbon atoms.

Example V

A polymerization run identical to Example IV using 0.50 ml. of methanol was run and 47 gm. of polymer was produced in 17 minutes. It contained 2.7 wt. percent PPVE, had a melt viscosity of $10.1 \times 10^4$ p., and contained 67 unstable end groups per $10^6$ carbon atoms.

Using a low initiator concentration and a small amount of methanol produced a polymer having good melt flow properties and a sufficiently small number of unstable end groups to maintain a volatiles index of less than 25 (less than 80 unstable end groups per $10^6$ carbon atoms). The polymer made where methanol was the chain transfer agent was much tougher than polymers made without methanol, even though the PPVE content was lower.

Data from Examples I–V are compiled in Table I.

Examples VI–VIII

A series of polymerizations were carried out using the procedure of Example I. The ingredients were 1340 gm. of F-113, 28 gm. of PPVE, 0.025 gm. 3-P initiator, and 0–1.0 ml. of methanol. The run temperature was 50° C. and run pressure was 75 p.s.i.g. In each case the resulting polymer contained 2.5 wt. percent PPVE. The melt viscosities and end groups obtained are shown in Table II. The melt viscosity was decreased by the methanol and the end groups which were produced were stable $CF_2H$ end groups.

Examples IX–XVI

A series of polymerizations were carried out using essentially the same procedure as described in Example I and to the autoclave were charged 860 ml. F-113 and 28 grams of PPVE. (In some of the examples either methanol or cyclohexane was also charged at this point.) The mixture was heated to 60° C. and stirred at 500 r.p.m. TFE was added to bring the total pressure to 90 p.s.i.g. Then, the desired amount of 3-P solution was added. During the polymerization, the pressure was maintained at 90 p.s.i.g. by continuous addition of TFE. The polymerization was usually continued until the temperature could no longer be controlled and then the product was dumped from the bottom of the reactor into a large stainless steel beaker. The polymer was dried in an air oven at 125° C. overnight. Table III gives a summary of the reaction conditions for each example and Table IV gives the properties of the polymers produced.

Examples IX–XII illustrate the effect of initiator concentrations on polymer properties. As the initiator concentration is increased the melt viscosity is decreased. However, in all cases the percent swelling is high (~50%) and the number of unstable end groups increases as well as the volatiles index. Examples XIII and XIV illustrate the effect of methanol on the polymer. The melt viscosity is reduced as desired without an increase in unstable end groups and consequently the volatiles index remains low (<25). The effect of methanol on percent swelling is also illustrated. The percent swelling is less than 25 in each case. Examples XV and XVI illustrate the effect of another chain transfer agent, cyclohexane, on the polymer. In both cases, the melt viscosity is reduced as desired without increase in volatiles index. However, the percent swelling remained high (>50%) in each case.

Examples XVII–XXVI

The MIT flex lives of a number of TFE/PPVE copolymers were determined. These polymers were made in "Freon"–13 using perfluoropropionyl peroxide initiator. In some cases methanol was also used as a chain transfer agent. The data are reported in Table V. The flex life is seen to increase with PPVE content and melt viscosity for a series of similarly produced polymers. The polymers made using methanol had substantially higher flex lives than polymers of similar PPVE contents and melt viscosities made without methanol.

TABLE V.—MIT FLEX LIFE OF TFE/PPVE COPOLYMERS

| Example | Chain transfer agent | Weight percent PPVE | Melt viscosity, ×10⁻⁴ poises (380° C.) | MIT flex life |
|---|---|---|---|---|
| XVII | None | 2.8 | 13 | 22,000 |
| XVIII | do | 2.7 | 18 | 73,000 |
| XIX | do | 3.2 | 13 | 51,000 |
| XX | do | 3.4 | 4 | 5,000 |
| XXI | do | 3.1 | 4 | 6,000 |
| XXII | Methanol | 2.7 | 13 | 104,000 |
| XXIII | do | 2.7 | 11 | 59,900 |
| XXIV | do | 2.6 | 4 | 12,000 |
| XXV | do | 2.5 | 17 | 227,800 |
| XXVI | do | 7.0 | 8 | 1,750,000 |

I claim:

1. A process for forming a polymer of tetrafluoroethylene monomer and at least one fluorovinylether monomer copolymerizable therewith which comprises polymerizing tetrafluoroethylene with fluorovinyl ethers selected from the group consisting of (a) fluorovinyl ethers having the general formula $$XCF_2(CF_2)_nOCF=CF_2$$

where X=F or H and $n$=1–7, (b) fluorovinyl polyethers having the general formula $$XCF_2(CF_2)_nO\overset{\underset{\displaystyle CF_3}{|}}{C}FCF_2OCF=CF$$

TABLE I

| Example | Reagents | | | | Conditions | | Run Time (min.) | Polymer (gm.) | Polymer Properties | | | |
|---|---|---|---|---|---|---|---|---|---|---|---|---|
| | F-113¹ (gm.) | PPVE² (gm.) | 3-P³ (gm.) | MeOH (ml.) | Temp. (°C.) | Pres. (p.s.i.g.) | | | Weight Percent PPVE | Melt viscosity (poises ×10⁻⁴) | End groups⁴ | MIT flex life |
| I | 1,340 | 10.6 | 0.74 | 0 | 50 | 30 | 10 | 63 | 3.7 | 10.4 | 109 | 57,000 |
| II | 1,340 | 16.5 | 0.10 | 0 | 50 | 45 | 22 | 49.7 | 2.5 | 170 | 44 | |
| III | 1,340 | 16.5 | 0.10 | 0.50 | 50 | 45 | 33 | 60.5 | 2.7 | 13.5 | 33 | 104,000 |
| IV | 1,340 | 28 | 0.10 | 0 | 60 | 90 | 11 | 75.8 | 2.8 | 158 | 41 | |
| V | 1,340 | 28 | 0.10 | 0.50 | 60 | 90 | 17 | 47 | 2.7 | 10.1 | 67 | |

¹ 1,1,2-trichloro-1,2,2-trifluoroethane.
² Perfluoropropyl perfluorovinyl ether.
³ Perfluoropropionyl peroxide.
⁴ COF, COOH, COOMe, and CF=CF₂ end groups per 10⁶ C atoms.

TABLE II

| Example | MeOH (ml.) | Melt viscosity, ×10⁻⁴ poises (380° C.) | End groups per 10⁶ C atoms | | | | | |
|---|---|---|---|---|---|---|---|---|
| | | | COF | COOH (M) | CF=CF₂ | COOH (D) | COOMe | CF₂H |
| VI | 0 | 854 | 28 | 1 | | | | 63 |
| VII | 0.50 | 17.1 | 14 | | 3 | | 6 | 127 |
| VIII | 1.00 | 3.6 | 13 | 11 | 21 | 3 | 19 | 178 |

TABLE III.—POLYMERIZATION CONDITIONS FOR EXAMPLES IX THROUGH XVI

| Example | F113 (ml.) | PPVE (g.) | MeOH (ml.) | Cyclohexane (ml.) | 3-P* (g.) | Pres (p.s.i.g.) | Temp. (°C.) | Time (min.) | Polymer (g.) |
|---|---|---|---|---|---|---|---|---|---|
| IX | 860 | 28 | | | .025 | 90 | 60 | 38 | 81 |
| X | 860 | 28 | | | .05 | 90 | 60 | 12 | 74.2 |
| XI | 860 | 28 | | | .10 | 90 | 60 | 5 | 66.5 |
| XII | 860 | 28 | | | .10 | 90 | 60 | 2 | 29.5 |
| XIII | 860 | 28 | 0.10 | | 0.25 | 90 | 60 | 61 | 96.7 |
| XIV | 860 | 28 | 0.5 | | .025 | 90 | 60 | 60 | 86.3 |
| XV | 860 | 28 | | 0.10 | .05 | 90 | 60 | 41 | 83.1 |
| XVI | 860 | 28 | | 0.20 | .05 | 90 | 60 | 60 | 65.8 |

*3-P added as solution in F113.

TABLE IV.—PROPERTIES OF POLYMERS FROM EXAMPLES IX–XVI

| Example | Weight percent PPVE | Melt viscosity (380°) ×10⁻⁴ poises | Percent swelling | Unstable end groups, No./10⁶ C atoms | Volatiles index |
|---|---|---|---|---|---|
| IX | 2.41 | 464 | 47 | 60 | 28 |
| X | 2.59 | 149 | 55 | 62 | 32 |
| XI | 3.22 | 44.2 | 53 | 138 | 36 |
| XII | 3.45 | 10.8 | 57 | 284 | 46 |
| XIII | 2.68 | 28.0 | 15 | 65 | 13 |
| XIV | 2.36 | 8.6 | 13 | 70 | 13 |
| XV | 2.45 | 59 | 52 | | 33 |
| XVI | 2.41 | 18 | 59 | | 21 | where X=F or H and $n$=0–7, and (c) perfluoro-3,6-dioxa-4-methyl-7-octene sulfonyl fluoride, in a liquid solvent selected from the class consisting of (a) perfluorinated solvents, (b) chlorofluoroalkanes in which each carbon atom has at least one fluorine atom attached thereto, and (c) chlorofluorohydroalkanes in which each carbon atom has at least one fluorine atom attached thereto and which may contain a maximum of one hydrogen atom per carbon atom if the hydrogen atom is present only in the difluoromethyl (CF₂H) grouping, at a temperature in the range from 30° C. to about 75° C. and at pressures in the range of from about 15 to about 1000 p.s.i.g., in the presence of a hydrogen-containing chain transfer agent selected from the group consisting of methanol, isopropanol, and ethanol thereby to provide a copolymer having stable hydride end groups.

2. The process of claim 1 in which the solvent is selected from the group of solvents consisting of $CCl_2F_2$, $CCl_3F$, $CClF_2H$, $CCl_2FCCl_2F$, $CCl_2FCClF_2$, and $$CClF_2CClF_2$$

3. The process of claim 2 in which the chain transfer agent is methanol.

4. The process of claim 3 in which the solvent is $CCl_2FCClF_2$, the copolymerizable monomer is perfluoropropyl perfluorovinyl ether and the initiator is bis(perfluoropropionyl) peroxide.

5. The process of claim 4 in which the copolymerizable monomer is perfluoroethyl perfluorovinyl ether.

6. A tough, stable copolymer of tetrafluoroethylene with a fluoroalkylperfluorovinyl ether selected from the group consisting of (a) fluorovinyl ethers having the general formula $XCF_2(CF_2)_nOCF=CF_2$ wherein $X=F$ or $H$ and $n=1-7$, (b) fluorovinyl polyethers having the general formula

$$XCF_2(CF_2)_nO\overset{|}{C}FCF_2OCF=CF$$

wherein $X=F$ or $H$ and $n=0-7$, and (c) perfluoro-3,6-dioxa-4-methyl-7-octene sulfonyl fluoride, said copolymer containing stable hydride end groups and having a volatiles index of less than 25, a swelling index of less than 25 and a melt viscosity from $1 \times 10^4$–$100 \times 10^4$ poises.

7. The product of claim 6 in which the fluoroalkyl perfluorovinyl ether is perfluoroethyl perfluorovinyl ether.

8. The product of claim 6 in which the fluoroalkyl perfluorovinyl ether is perfluoropropyl perfluorovinyl ether.

References Cited

UNITED STATES PATENTS

| | | | |
|---|---|---|---|
| 2,975,163 | 3/1961 | Lo | 260—87.5 A |
| 3,162,622 | 12/1964 | Aldrich | 260—87.5 A |
| 3,282,875 | 11/1966 | Connolly et al. | 260—87.5 A |
| 3,450,684 | 6/1969 | Darby | 260—87.5 A |

JOSEPH L. SCHOFER, Primary Examiner

J. A. DONAHUE, JR., Assistant Examiner

U.S. Cl. X.R.

260—80, 76